Dec. 6, 1955

J. P. WEHBY 2,725,827

COMPARTMENTALIZED VEHICLE

Filed Sept. 2, 1953

3 Sheets-Sheet 1

INVENTOR
JACK P. WEHBY

BY *A. Yates Dowell*

ATTORNEY

Dec. 6, 1955  J. P. WEHBY  2,725,827
COMPARTMENTALIZED VEHICLE
Filed Sept. 2, 1953  3 Sheets-Sheet 2
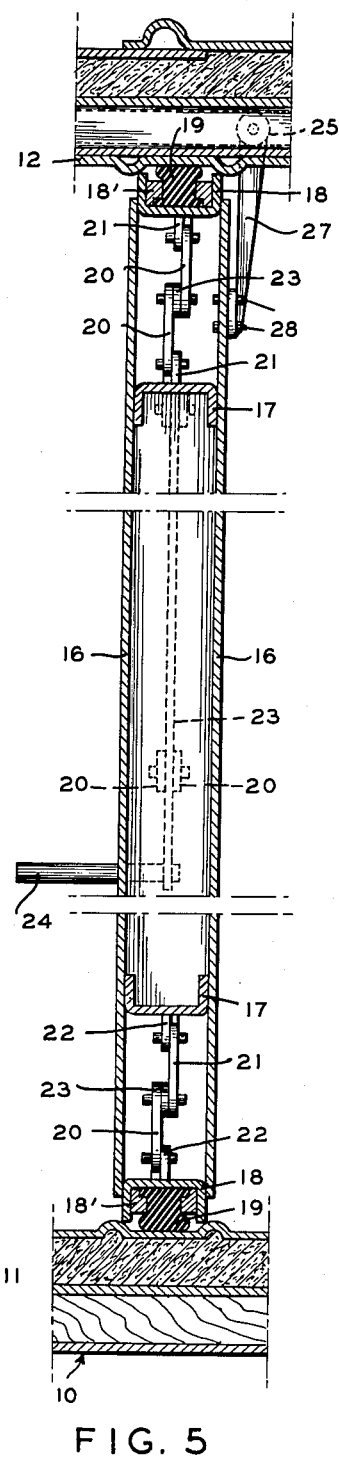
FIG. 5
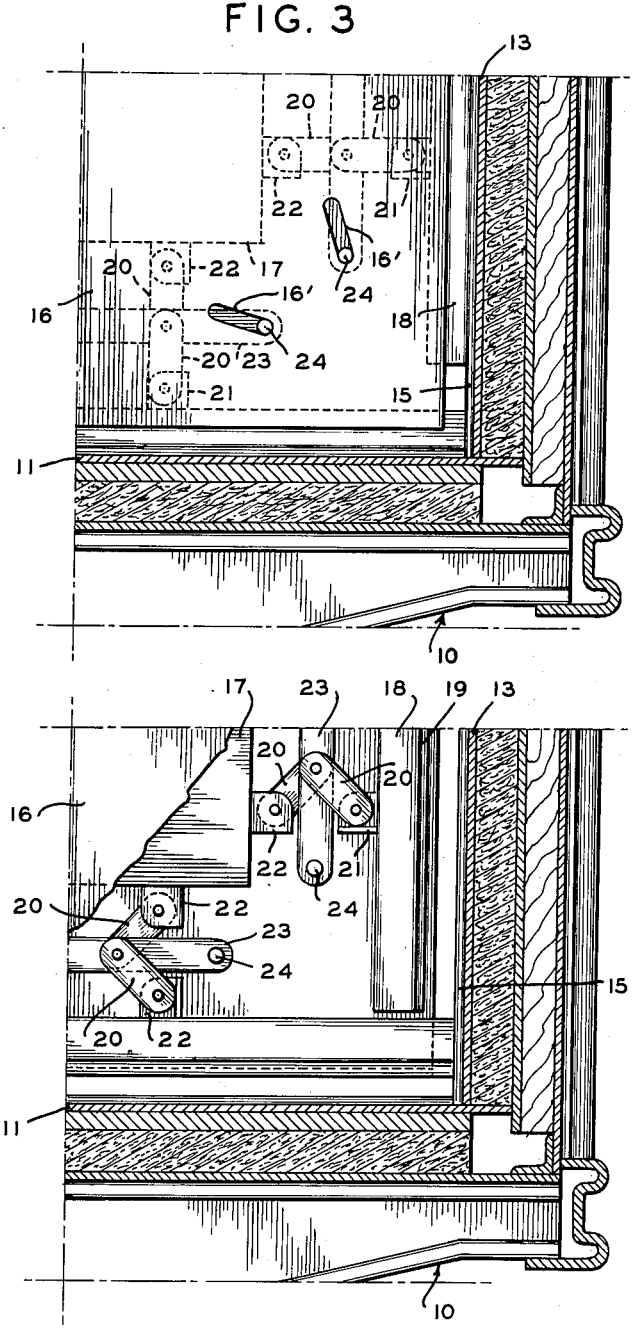
FIG. 3
FIG. 4
INVENTOR
JACK P. WEHBY
BY A. Yates Dowell
ATTORNEY

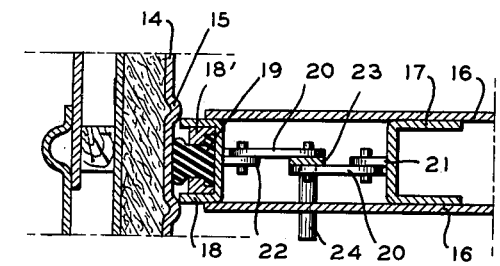
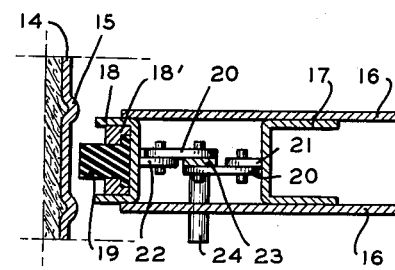
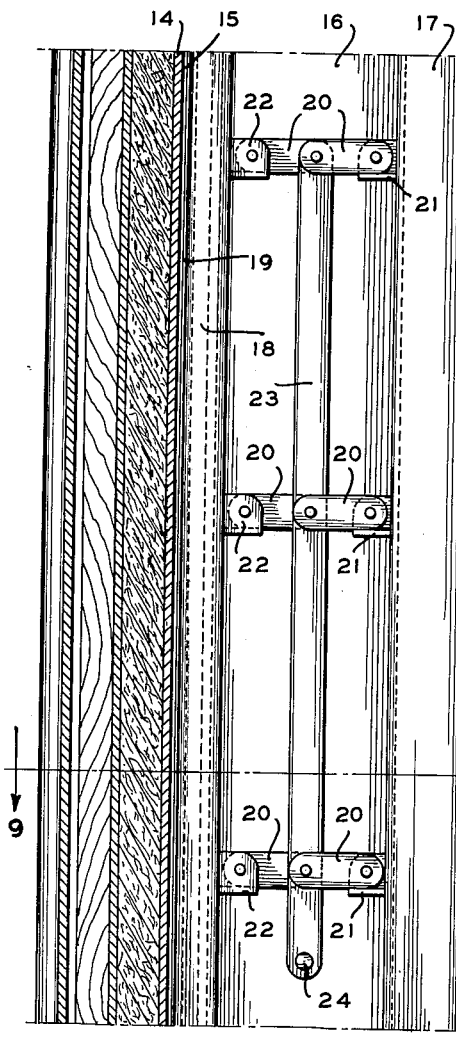
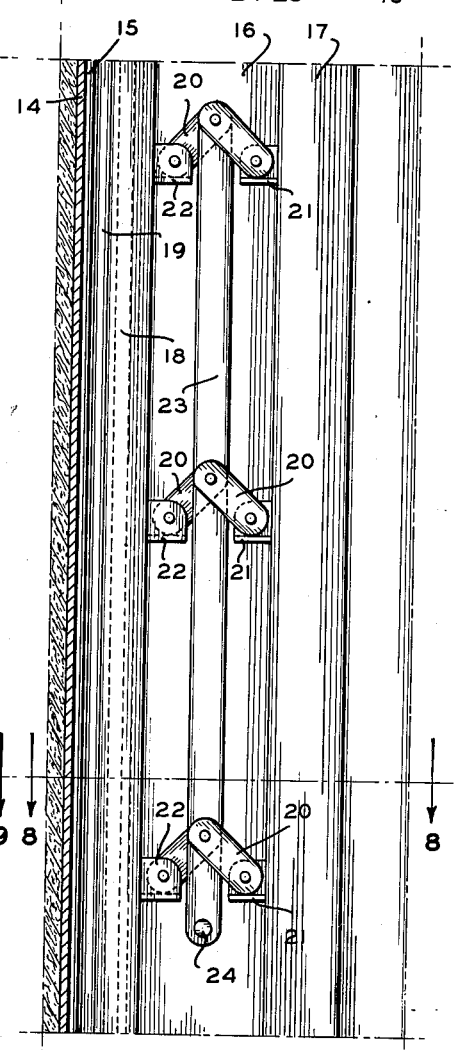

United States Patent Office 2,725,827
Patented Dec. 6, 1955

2,725,827

COMPARTMENTALIZED VEHICLE

Jack P. Wehby, Nashville, Tenn.

Application September 2, 1953, Serial No. 378,155

3 Claims. (Cl. 105—376)

This invention relates to the transportation of commodities of various kinds including foods, and both to the apparatus or equipment employed and to the method or manner in which such equipment is used. The invention is particularly concerned with large volume transportation which involves interstate commerce.

In local and long distance hauling many problems are involved in attempting to obtain maximum efficiency. In addition to movement from one place to another maximum flexibility is desirable in order to accommodate the various conditions encountered including differences in distance, accessibility, atmospheric conditions, and bulk or size of the commodity.

Other problems arise in undertaking to transport and preserve the products until they are deposited at their destination. In order to overcome these problems temperature and humidity modification are necessary as well as the efficient use of energy to provide the necessary conditions for substances which require temperatures below freezing, to others which require temperatures slightly above freezing, and others which are not affected by changes in atmospheric condition.

It is an object of the invention to provide a vehicle which is adapted both to local and long distance hauling and so constructed that portions of its cargo are readily available at all times, and in which the area of the interior is subject to modification to provide increased or decreased storage compartments which are maintained at proper temperatures and humidities.

Another object of the invention is to provide a vehicle in which storage space is susceptible of subdivision to accommodate the nature and character of the load and to provide the desired conditions within each including easily movable portions which readily may be located in the desired position and quickly and efficiently secured therein.

Another object of the invention is to provide a vehicle having movable partitions including adjustable seals which make a tight joint between the partitions and the walls within which they are installed.

Figure 1:
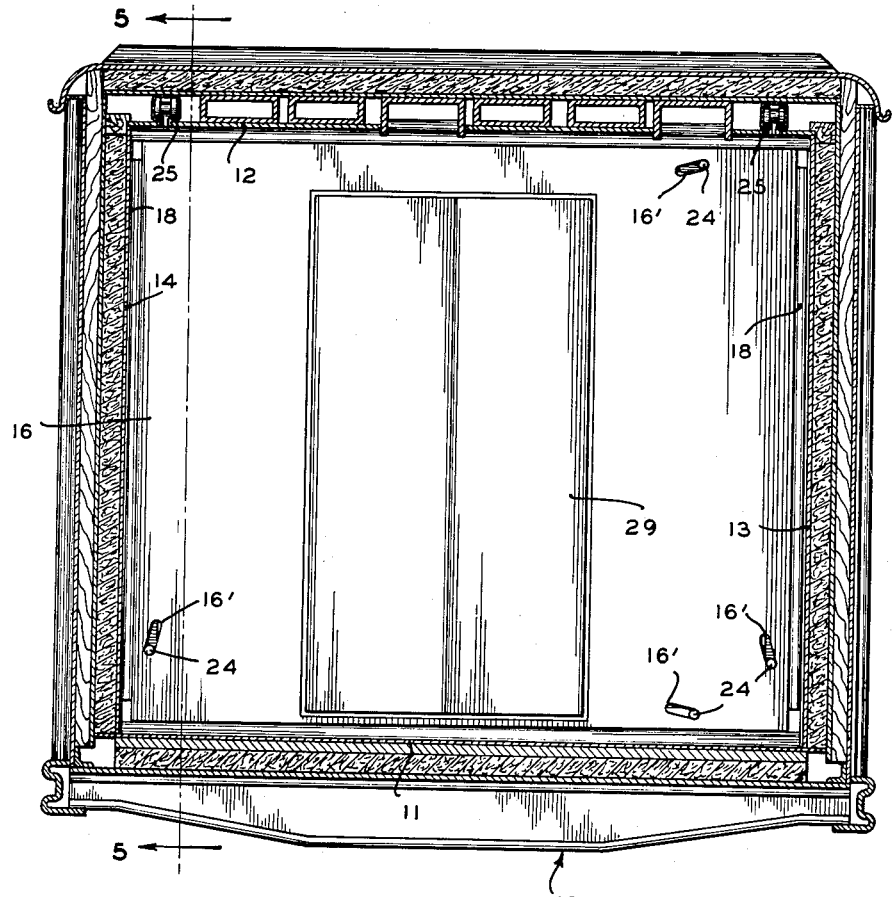
Figure 2:
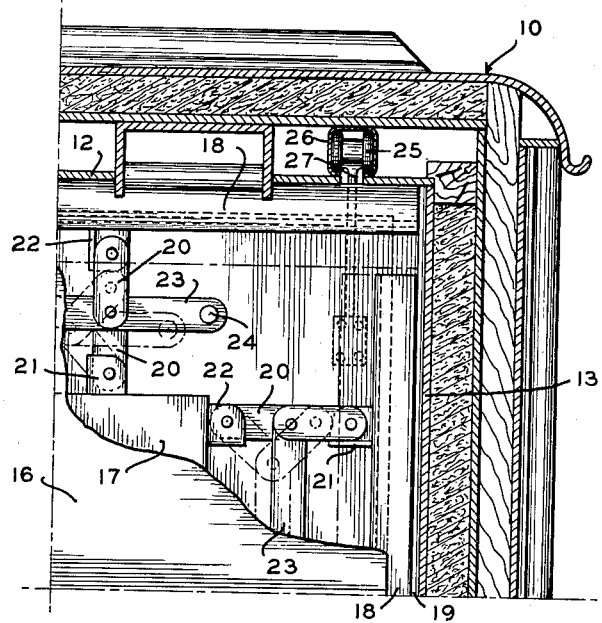

Further objects and advantages of the invention will be apparent from the following description taken in conjunction with the accompanying drawings wherein:

Fig. 1 is a vertical transverse section;

Fig. 2, an enlarged detail of the upper right hand corner of Fig. 1;

Fig. 3, a similar view of the lower right hand corner;

Fig. 4, a view similar to Fig. 3 with parts broken away for greater clarity;

Fig. 5, a vertical sectional on the line 5—5 of Fig. 1;

Fig. 6, a fragmentary elevation of the operating mechanism for the seal, with the sealing means in retracted position;

Fig. 7, a view similar to Figure 6 illustrating the operating mechanism in extended position;

Fig. 8, a horizontal sectional view taken on the line 8—8 of Figure 6; and

Fig. 9 is a similar view taken on the line 9—9 of Fig. 7.

Briefly stated, the invention comprises a truck, trailer or other vehicle having bottom, top and side walls with projections or depressions by means of which partitions may engage the walls and be anchored in position. These projections may be continuous from top to bottom of the side walls and form partitions locating and anchoring ribs or they may be either elongated portions disposed in short spots or parallel relation to permit the partitions to fit between them.

The partitions comprise suitable frames with opposed panels between which are located movable keepers with sealing gaskets carried therein. The keepers are connected by a series of toggle links with the frame of the partitions so that when each set of toggle links is in a straight line the respective keeper, located between the respective spaced parallel projections, will be extended. Each keeper sealing gasket which, when the keeper is extended, will engage the side wall of the vehicle and be compressed thereagainst.

The links of a series of aligned toggles may be moved by an operating rod having a handle disposed at one end. Thus the keeper and sealing gasket can be moved into contact with the respective wall of the vehicle to lock the partition in place.

With continued reference to the drawings a truck or trailer 10 has an insulated bottom wall 11, a top wall 12, and side walls 13 and 14, as shown particularly in Figures 5, 8 and 9. The inner surfaces of the side walls 13 and 14 are provided with vertical anchoring ribs 15 which extend a substantial portion of the distance from the top to bottom of the side walls.

Partitions are adapted to be anchored between opposed sets of ribs in opposite walls, said partitions including side panels 16 mounted on suitable frames 17 and with insulation for retarding flow of heat through such partitions. Between the side panels along the four marginal edges of the partition, is slidably mounted a keeper 18 in which is carried a sealing gasket 19, such keeper and gasket being movable outwardly into contact with the adjacent wall of the truck and retractable out of contact with such wall.

In order to fasten the keeper and its sealing gasket between the side panels of the partition in a manner that they can be moved outwardly or retracted as desired, toggle links 20 are employed to connect projections 21 on the frame 17 and similar projections 22 on the keeper 18. When the links of each pair are in a straight line or in substantial alignment, as indicated in Figs. 7 and 9, the keepers and gaskets will be in fully extending sealing position, and when they are away from such straight line as far as possible the associated keepers and gaskets will be fully retracted.

The gasket 19 is held within the keeper 18 by means of retaining strips 18' secured by spot welds or in any other desired manner within the keeper 18. If desired the retaining strips 18' could be formed integrally with the keeper or applied thereto prior to the application of the gasket but with less facility.

An operating rod or bar 23 may be connected to the pivot between the pairs of links for operating the same. If desired a handle 24 may be attached to the end of the rod or bar for facilitating operation thereof. This handle extends through an angularly disposed slot 16' for ready accessibility.

A series of the partitions may be suspended by overhead trolleys composed of a pair of wheels 25 rolling in a track or casing 26 and with depending suspension arms 27 attached by fastening elements 28 to the partitions. Thus the partitions may be moved from end to end of the vehicle and locked in any desired position between anchoring ribs 15.

If desired, the partitions may be provided with one or more doors 29 permitting access through the same. The bottoms, top and side walls are provided with the necessary insulation to retard the flow of heat through such walls. Also suitable ducts may be provided in the ceiling of the vehicle for the circulation of air, the temperature and humidity of which may be suitably controlled in any desired manner.

It will be readily understood that the present invention is an improvement over my Patents 2,633,714, granted April 8, 1953; 2,677,244, granted May 4, 1954; and 2,677,246, granted May 4, 1954.

It will be obvious to those skilled in this art that various changes may be made in the invention without departing from the spirit and scope thereof and therefore the invention is not considered restricted by that which is shown in the drawing and described in the specification but only as indicated in the accompanying claims.

What is claimed is:

1. A vehicle having bottom, top and side walls insulated against the passage of heat, said walls having a plurality of spaced pairs of raised projections, one or more partitions having spaced wall panels in said vehicle disposed between each pair of said projections, supporting means carried by said vehicle for said partitions, frame structure fixedly supporting said wall panels, keepers along and within the margins of said partitions between said wall panels, sealing gaskets disposed lengthwise along said keepers and retained by said keepers, said keepers being movable outwardly of said panel into contact with the walls of the vehicle and with said sealing gasket compressed against such walls, said keepers being retractable to withdraw said sealing gaskets from contact with said walls, a series of pairs of pivotally connecting toggle forming links connecting said frame structure with each of said keepers, whereby when the links of the toggle are in substantial alignment said keeper will be in its extended position and when said links are out of alignment said keeper will be in retracted position, operating means within said partition connecting said links for extending and retracting said keepers and sealing gaskets, and actuating means for said operating means accessible exteriorly of said partition.

2. A vehicle as set forth in claim 1, including overhead trolleys rolling in a track running longitudinally of the vehicle, suspension arms connected to said trolleys and attached to said partition whereby said partition may be moved from end to end of the vehicle and locked in any desired position between the raised projections of the walls of the vehicle.

3. A vehicle as set forth in claim 1, wherein the frame structure comprises a pair of channel shaped members facing each other and rigidly supporting the wall panels.

References Cited in the file of this patent

UNITED STATES PATENTS

| | | |
|---|---|---|
| 622,138 | Gardner | Mar. 28, 1899 |
| 2,005,086 | Jones | June 18, 1935 |
| 2,220,436 | Ziegler | Nov. 5, 1940 |
| 2,482,367 | Ravers | Sept. 20, 1949 |
| 2,575,459 | Moten | Nov. 20, 1951 |
| 2,633,714 | Wehby | Apr. 7, 1953 |
| 2,677,244 | Wehby | May 4, 1954 |
| 2,677,246 | Wehby | May 4, 1954 |
| 2,715,040 | Rhoads | Aug. 9, 1955 |